Feb. 28, 1967 J. M. GOODWIN ETAL 3,306,983

CALL TRANSFER SYSTEM

Filed Dec. 20, 1963 2 Sheets-Sheet 1

INVENTORS J. M. GOODWIN
R. L. HAYES
J. W. LOOFBOURROW

BY William F. Simpson.

ATTORNEY

Feb. 28, 1967  J. M. GOODWIN ET AL  3,306,983

CALL TRANSFER SYSTEM

Filed Dec. 20, 1963  2 Sheets-Sheet 2

United States Patent Office 3,306,983
Patented Feb. 28, 1967

3,306,983
CALL TRANSFER SYSTEM

James M. Goodwin, Holmdel, Richard L. Hayes, Red Bank, and John W. Loofbourrow, Westfield, N.J., assignors to Bell Telephone Laboratories, Incorporated, New York, N.Y., a corporation of New York Filed Dec. 20, 1963, Ser. No. 332,003
15 Claims. (Cl. 179—26)

Figures 1, 3:
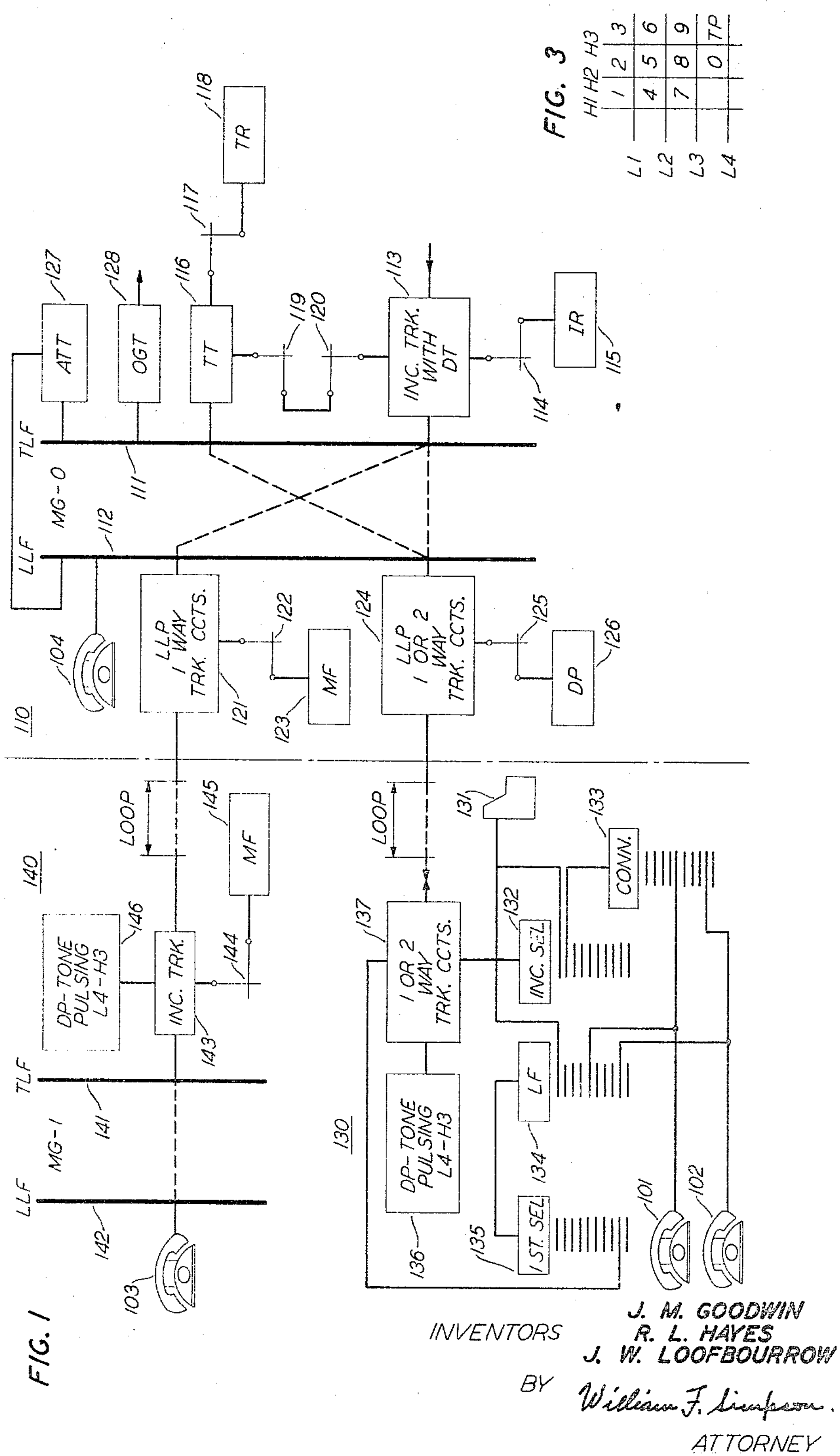

This invention relates to communication switching systems and, more particularly, to an arrangement for permitting a telephone subscriber at a PBX or satellite station to transfer an incoming call to his station to any other of the PBX or satellite stations or to any other of a selected group of stations by the operation of his dial and without the aid of either a PBX attendant or a central switching station operator.

Recently developed telephone systems provide what is referred to as CENTREX service in which a number of different PBX groups of stations may utilize a common switching center while at the same time providing usual private branch exchange services. Further in recently developed systems it is both desirable and possible to provide both direct inward dialing and dial transfer service.

Direct inward dialing enables a call directed to a PBX extension or subscriber station to be dialed by the calling party, at a distant exchange, and to be automatically completed directly to the called extension of the PBX without the intervention of the usual PBX attendant or operator. Dial transfer enables the called extension to flash his switchhook to obtain a dial pulse register and then to dial a different extension to which the call is to be transferred.

One example of a common use of a single switching center, a No. 5 crossbar system, by a plurality of distinct PBX groups of subscriber stations is disclosed in a patent application of D. R. Fisher, E. J. Gesing, F. H. Koster, and R. J. Kowalinski, Serial No. 191,507, filed May 1, 1962, now Patent No. 3,253,088, issued May 24, 1966; this application discloses an arrangement in which one or more groups of certain designated stations connected to a central switching center are provided with service similar to that provided by a private branch exchange or by a satellite switching center. In the arrangement described in this patent application one of the designated stations may receive a call in response to calling signals which are directly dialed by any subscriber connected to the central switching center or at some other switching center connected thereto. The called subscriber may then call in an operator by operation of the switchhook or cradle contacts and the operator may then transfer the call to any other station of the designated group or to other stations.

A patent application of E. R. Fulwiler, R. L. Hayes, E. D. Masucci, and W. M. Wilson, Serial No. 155,290, filed November 28, 1961, now Patent No. 3,115,552, issued December 24, 1963, discloses an arrangement similar to that disclosed in the above-identified patent application, Serial No. 191,507 but in addition discloses the dial transfer arrangement in which a call incoming to a station of a designated group may cause this call to be transferred to any other station of the designated group by the operation of the dial at the called station. The circuits then cause the call to be transferred to the station dialed by the first station without the aid of an operator or attendant at the central switching center.

In both of the above arrangements the PBX subscribers are directly served from the main switching center. There is already in use, however, a very large investment in small automatic private branch exchanges, particularly of the step-by-step type, which are remote from the main switching centers but connected thereto by trunk groups.

It is desirable that the work of the PBX attendants at these exchanges also be obviated with respect to both incoming calls and the transfer of calls.

The first of these functions is attained by the arrangements disclosed in the patent application of T. V. Burns, E. L. Erwin, G. J. Krall, E. D. Masucci, and C. J. Vincent Serial No. 240,558, filed November 28, 1962, which application describes an arrangement at a central switching center whereby subscribers at the remote PBX or satellite switching center may be directly called by means of dial pulses transmitted from the central switching center in response to calling signals received at the switching center from some other station connected thereto or from some other switching center.

It is a general object of our invention to attain the second of the above-mentioned functions, namely, an automatic dial transfer, at PBX or other satellite exchanges remote from and independent from the main switching center through which they are connected to the main telephone system network.

In the past, it has not been possible to transmit dial pulses back from a called station, at a PBX or other satellite center, through a main switching center because the usual supervisory relays will not satisfactorily respond to such signals.

Accordingly, it is a further object of our invention to provide an arrangement whereby subscribers at a PBX or satellite switching station may transmit signals under control of a dial at a called satellite or PBX station back to the central switching center which signals will be transmitted around the supervisory relays and equipment and which signals will cause the equipment at the main switching center and the PBX center to transfer the incoming call to another satellite or PBX station designated by calling signals transmitted by means of the dial at the first called PBX or satellite station.

Another object of our invention is to transfer by means of a dial and dial pulses transmitted thereby a call incoming to a PBX or satellite station to anoher station connected to the main switching center to which the PBX or satellite is connected.

Another object of our invention is to transfer a call incoming to one subscriber's station connected to one switching center to another subscriber's station connected to another switching center under control of the dial at the first called subscriber's station.

A feature of our invention relates to apparatus for converting dial pulses into pulses of voice frequency alternating current and then transmitting these alternating-current pulses back over an established communication path through one or more switching centers to control the establishment of an alternate path to another subscriber's station.

Another feature of our invention is to use a combination of two tones to represent dial pulses which combination is not normally employed to represent calling signals.

Figure 2:
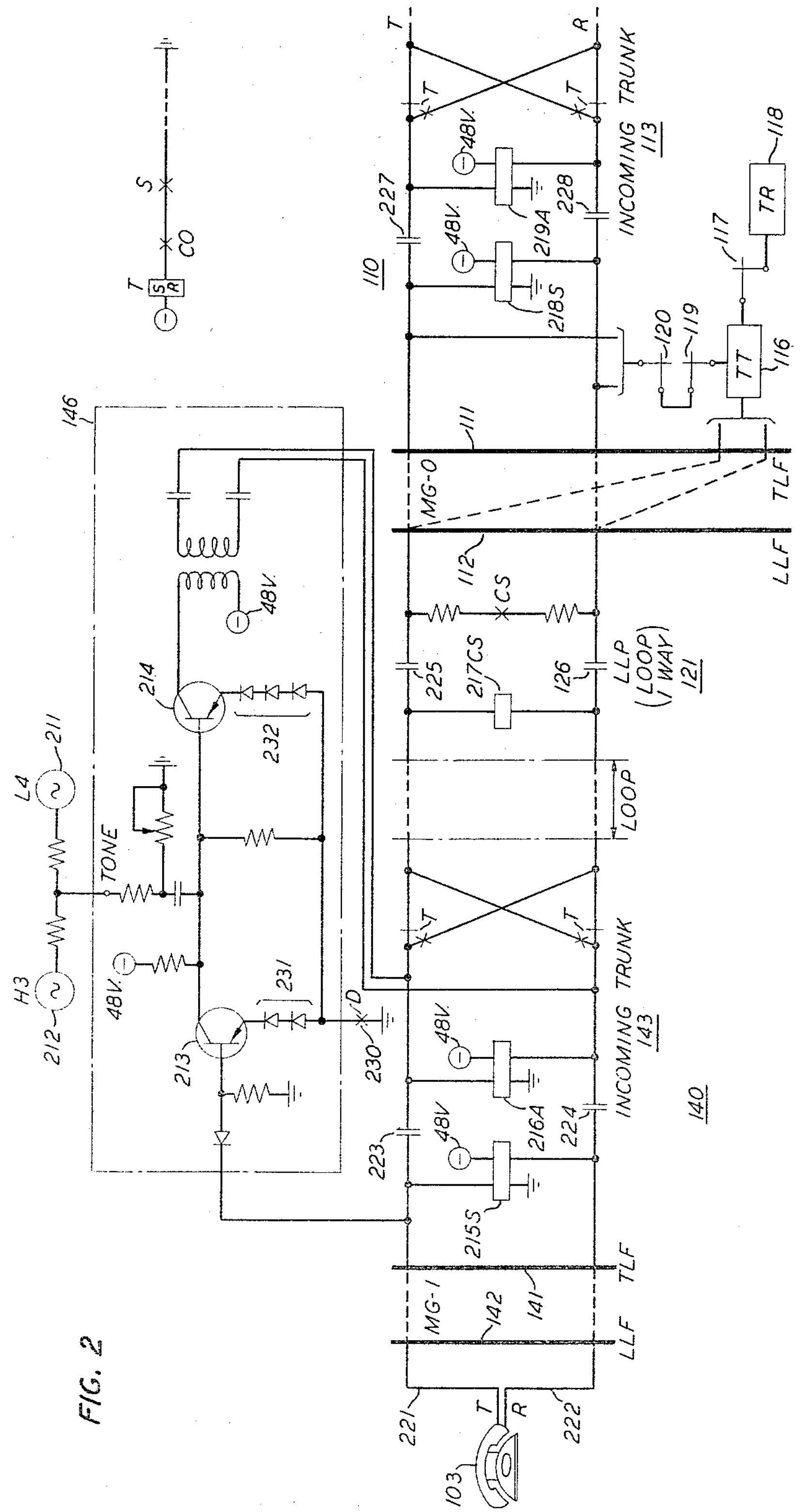

The foregoing and other objects and features of this invention may be more readily understood from the following description when read with reference to the attached drawing, in which:

FIG. 1 illustrates the manner in which the various subscriber's stations interconnected with a PBX switching center, a main switching center and a second main switching center are interconnected one with another to provide automatic transfer of incoming calls to designated ones of said subscriber's stations to other subscriber's stations under control of signals transmitted from the first called subscriber's station;

FIG. 2 shows in greater detail the circuits for converting the dial pulses into alternating-current pulses which then may be transmitted back over an established communication path and control switching equipment in one of the prior switching centers through which a call was established; and FIG. 3 shows the various combinations tones normally employed to represent the digits 1 through 0 in accordance with TOUCH-TONE signaling ararngements and also the combination designated TP for tone pulsing in accordance with our invention which combination comprises the H3 and L4 tones.

FIG. 1 shows a crossbar switching center 110 (main switching center), a step-by-step type of PBX 130 and a second crossbar switching center 140.

The crossbar switching center 110 is provided with the various features described in the above-identified patent applications, Serial Nos, 155,290, 191,507 and 240,558. A typical crossbar type switching center of this type is also described in U.S. Patent 2,585,904, granted to A. J. Busch on February 19, 1952. The exemplary embodiment of our invention described herein also includes the crossbar switching system 140 which may also be of the general type disclosed in the above-identified patent to Busch or it may be of any other suitable type of switching center.

The PBX swtching center is a step-by-step type switching center in the exemplary embodiment described herein. In addition, PBX switching center 130 is a satellite office to main switching center 110. This center includes the line finders 134, first selectors 135, the incoming selectors 132, the connectors 133 and one or two-way trunk circuits 137. The PBX stations 101 and 102 are connected both to the line finders 134 and the connectors 133.

The marker and various marker connector circuits and other of the circuits of the switching center 110 and 140 are not represented in FIG. 1. These portions of these systems are clearly described in the above-identified Busch patent and in the above-identified patent applications which are incorporated herein by reference as if fully included herein.

Briefly, the switching center 110 comprises a trunk link frame 111 and the line-link frame 112. The attendant's trunk 127 is connected both to the line-link frame and the trunk link frame. This is an attendant's station or position or trunk for a group of stations provided with service analogous to PBX service as described in the above-identified patent application, Serial No. 191,507.

The outgoing trunk circuit 128 represents the various outgoing trunk circuits from this switching center to other switching offices as described in the above-identified Busch patent.

In accordance with an exemplary embodiment of our invention described herein the incoming trunk 113 is provided with the dial transfer features similar to those disclosed in the above-identified patent application, Serial No. 155,290. This trunk will be interconnected through a connecting circuit and switch 114 to an incoming register 115 which registers the incoming signals which are later employed to control the establishment of a connection from this trunk to some subscriber's station or to another outgoing trunk circuit. Connection may also be established to one-way or two-way line-link pulsing circuits 124 to the step-by-step PBX. This line-link pulsing circuit 124 will be interconnected through a connector circuit 125 to a dial pulse sender 126 in the manner described in the above-identified patent application, Serial No. 240,558. The marker in setting up a connection from the trunk circuit 113 to one of the line-link pulsing circuits 124 in the manner described in the above-identified patent application, Serial No. 240,558, also causes the dial pulse sender 126 (first pulsing circuit) to be interconnected with the line-link pulsing circuit 124 and causes the dial pulse sender 126 to be conditioned so that it will cause the proper dial pulses to be transmitted over the circuit extending to the PBX 130 and the incoming selector 132 which in turn responds to the pulses transmitted from the dial pulse sender 126 and directs a call to a proper connector 133 which in turn responds to further dial pulses from the sender 126 and causes the call to be extended to the called PBX subscriber's station 101, for example. When the subscriber's station 101 answers, the dial pulse tone pulsing circuit 136 is conditioned for operating.

If the call requires redirection, the call PBX subscriber 101 will flash or momentarily operate the switchhook or cradle contacts. The momentary operation of the switchhook contacts is transmitted back over the usual supervisory circuits and relays to the trunk circuit 113. This signal causes the incoming trunk circuit 113 to recall the marker circuit as described in the above-identified patent application Serial No. 155,290. In addition, the trunk circuit 113 causes the line-link pulsing circuit 124 to be identified. The marker then establishes another connection from the line-link pulsing circuit 124 through the line-link frame crossbar switches 112 and the crossbar switches of the trunk link frame 111 to the transfer trunk 116. In addition, a connection is established through the connecting switch 117 to a transfer register 118 which causes dial tone to be transmitted through the transfer trunk 116, through the crossbar switches on the trunk link frame 111, through the crossbar switches on the line-link frame 112, the line-link pulsing circuit 124 and then through the incoming trunk circuit 137 and incoming selector 132 and connector 133 to the called subscriber's station 101.

The subscriber 101 will then dial the designation of the station to which he desires the call to be transferred. When the subscriber at station 101 operates the dial it causes the line to the subscriber's station 101 to be momentarily opened by each dial pulse.

Assume first that the subscriber will dial the designation of station 102 at this time. The dial pulses representing this designation are thus transmitted back through the connector 133, the incoming selector 132 to the dial tone pulsing circuit 136. Here the dial pulses are converted to the combination of two tones or two alternating-current frequencies as shown in FIG. 3 comprising the H3 and the L4 tones and then transmitted back over the loop circuit and through the line-link pulsing circuit 124 and through the crossbar switches of the line-link frame 112 and the trunk link frame 111 to the transfer trunk 116, and then from the transfer trunk through the connector circuit 117 to the transfer register 118. These dial pulse tones are recorded in this transfer register 118 at this time.

FIG. 3 depicts the current coding of ten digits for TOUCH-TONE signaling using pairs of frequencies selected from a low group of frequencies (L1 through L4) and a high group of frequencies (H1 through H3). As can be readily seen in FIG. 3 this coding arrangement does not exhaust the possible combinations. One of these unused combinations is therefore advantageously employed in this embodiment of our invention and specifically the combination represented by the frequency pair L4–H3. Accordingly, automatic dial transfer arrangements in accordance with our invention may be used compatibly in systems wherein TOUCH-TONE dialing is regularly employed. However, it should be noted, that the other frequency pairs indicated in FIG. 3 each represent a signal digit on a single occurrence of the frequency pair whereas the frequency pair L4–H3 indicates a single dial pulse for a transfer connection and accordingly these frequency pairs must be counted, as explained herein.

Transfer register 118 is a combined register of the type, known in the art, capable of registering both dial pulse and TOUCH-TONE or multifrequency signals. It further distinguishes between TOUCH-TONE signals each representing a single digit and the specific pair of signals transmitted from pulsing circuit 136, which signals must be counted and registered. When desired this register circuit may also be arranged to respond to the usual dial pulses. Accordingly, transfer register 118 is employed both for dialed transfer of calls solely within switching center 110 and also for transfer of calls by a called subscriber station at PBX 130.

Meantime a connection is also established through the connector circuits 119 and 120 to the incoming trunk 113. Thus, a communication path is re-established from the incoming trunk 113 to the originally called subscriber's station 101 through the connector circuits 120 and 119, through the transfer trunk 116 and trunk link frame 111 and line-link frame 112, to circuit 124 to the PBX 130, since the original path through the crossbar switches of the trunk link frame 111 and the line-link frame 112 from the incoming trunk circuit 113 to the line-link pulsing circuit 124 has been disconnected.

As described in the above-identified copending application, Serial No. 155,290 when the first called subscriber 101 has finished dialing the designation of the subscriber to whom the call is to be transferred, the marker will be called in again and notified that a transfer connection should be set up between the incoming trunk 113 and a second one of the line-link pulsing circuits such as 124 which is interconnected with the PBX station 130. In addition as described in the above-identified copending application, Serial No. 240,558 a dial pulse sender such as 126 will be attached to the second line-link pulsing trunk circuit 124 by means of a connected circuit 125. The connector circuit 117 is then released.

In addition this sender will be considered to transmit the proper dial pulses to extend the connection from the second trunk to the PBX 130 and through a second incoming selector 132 to a second connector 133 to the transfer station 102. When this station answers then each of the stations 101 and 102 may talk to each other and with the calling party. Then when the first called station 101 disconnects, the connection between the first called station 101 and the transfer trunk 116 will be released. Connector circuits 119 and 120 also release.

If the called station 102 does not answer then the called station 101 may cause the call to be transferred in a similar manner to still another station of the PBX group including an operator's position 131 at the PBX 130 or to an operator's or attendant's trunk 127 at the central switching station.

Instead of transferring the call to station 102 the subscriber station 101 may cause the call to be transferred to a station 104 connected to the line-link frame of the main switching station 110 provided of course that station 104 has been designated as one of the stations of the desired group or PBX.

Similarly, the station 101 may cause the call to be transferred to a station 103 connected to the second switching center 140. In order to transfer a call to such a station 103, assuming of course that this station has been designated as one of the stations in the desired group or PBX, the subscriber 101 first flashes or slowly operates the switchhook or cradle contacts and then when dial tone is received dials the desired station designation. The circuits operate in substantially the same manner as described above. When a coil is extended to the line-link pulsing circuit 121 extending to the switching center 140 a multifrequency outpulsing sender 123 will be attached through the connecting circuits 122 to the line-link pulsing circuit 121 instead of a dial pulse sender such as 126. The marker will condition the multifrequency sender 123 so that this sender will outpulse the necessary information to the switching center 140.

This information will be transmitted from the sender 123 through the connecting circuit 122, the line-link pulsing circuit termination 121 and then over the loop and through the incoming trunk circuit 143 and connecting circuit 144 to a multifrequency incoming register 145. When sufficient information has been transmitted to this register, connection will then be established from the incoming trunk circuit 143 through the crossbar switches of the trunk link frame 141 and the line-link frame 142 to the called station 103. Thereafter the circuits respond in substantially the same manner as described above when called station 103 has rotary dial.

When desired, any of the stations to which a call has been transferred may similarly transfer the call to any other of the stations including the first station in a manner similar to that described above.

When a call is directed to station 103 or when a call is transferred to it, the subscriber or attendant may similarly actuate his dial and cause a call to be transferred to any of the other stations or operator's positions of a designated group or PBX in the manner described herein. If the incoming trunk circuit 143 is provided with dial transfer circuits similar to the incoming trunk circuit 113 then the system will operate to transfer this call in a manner similar to the manner described above for transferring calls from any one of the stations of a selected group to any other of the stations included in the group.

However, in accordance with this invention, it is not necessary that this incoming trunk circuit 143 be so equipped. Instead, this trunk may be provided with the dial pulse tone pulsing circuit 146 similar to trunk 136.

The details of such an exemplary arrangement are shown in FIG. 2. The dial pulse tone pulsing circuit 146 is shown in detail in FIG. 2 and comprises two transistors 213 and 214 which are arranged as gate circuits and cause the tone sources 211 and 212 to be gated through the transistor 214 to the incoming trunk circuit 143. These pulses are then transmitted over the loop to the line-link pulsing circuit 121 and then through the switching equipment 110 to the transfer trunk circuit 116. From this transfer trunk circuit they are then transmitted through the transfer register connector 117 to the register circuit 118. These pulses are thus transmitted around the supervisory signaling circuits.

When the called station 103 answers, the tone pulsing circuit 146 is activated by the closure of the contact 230 of the D relay in the trunk circuit 137. At this time a negative potential will be applied to the left-hand terminal of condenser 223 from negative battery through the right-hand winding of relay 215S and then over the subscriber's loop conductors 222 and 221 to the left-hand terminal of condenser 223. The circuit also extends to ground through the left-hand winding of relay 215S. Thus the potential of this condenser terminal is determined by the voltage drop across the left-hand winding of the supervisory relay 215S. This negative potential is sufficient to saturate transistor 213 preventing transistor 214 from conducting since their emitters are connected to ground through the contacts 230 through biasing diodes 231 and 232.

When the subscriber at station 103 operates the dial and the dial contacts open the above-described negative potential is removed from the left-hand terminal of condenser 223 and ground potential through the left-hand winding of the supervisory relay 215S is applied to this terminal. The input to the dial pulse tone pulser 146 is connected to the left-hand terminal of this condenser so that upon the removal of the negative potential the emitter junction of the transistor 213 becomes back biased and this transistor becomes nonconducting. As a result the emitter junction of the transistor 214 becomes forward biased so that this transistor becomes an amplifier and amplifies the tones from the sources 212 and 211 to the trunk circuit.

Then when the dial contacts at station 103 close negative potential is again applied to the left-hand terminal of the condenser 223 and also to the input of the circuit 146 with the result that the emitter junction of the transistor 213 becomes forward biased and the transistor ceases to conduct. As a result, transistor 214 ceases to conduct and amplify thus interrupting the tone to the incoming trunk circuit 113.

Thus tone is transmitted over the trunk circuit during each open pulse from the dial of station 103. These pulses of tone are then transmitted over the loop circuit and the line-link pulsing circuit 121 and through the switching network to the transfer trunk circuit 116 and then to the transfer register as described above.

A similar dial pulse tone pulsing circuit 136 is connected to the trunk circuit between the PBX 130 and the incoming trunk 137 to the switching center 110. As shown in FIG. 1 this circuit 136 which is similar to circuit 146 is conected to the trunk circuit 137 at the PBX 130 so that the dial pulse tone pulses are transmitted back to the main switching office 110 from the PBX 130 in a manner similar to that described with respect to the circuit 146.

It is to be understood that the above-described arrangements are illustrative of the application of the principles of our invention. Numerous other arrangements may be devised by those skilled in the art without departing from the spirit and scope of our invention.

What is claimed is:

1. In a telephone switching system in combination a first switching center, a second switching center connected to said first switching center, a first and a second subscriber station connected to said second switching center, an incoming trunk connected to said first switching center, means responsive to calling signals to establish a communication path from said incoming trunk to said first subscriber station through both of said switching centers, means controlled from said first subscriber station for transmitting voice frequency signals back through said second switching center to said first switching center, and means at said first switching center responsive to said voice frequency signals to establish a path from said incoming trunk to said second subscriber station.

2. In a communication switching system in combination a plurality of interconnected switching centers, subscriber stations connected to at least certain of said switching centers, means for establishing a first communication path through a plurality of said switching centers to one of said subscriber stations, means controlled by said one subscriber station for transmitting transfer signals back over said communication path through a plurality of said switching centers, and means at one of said switching centers responsive to said transfer signals to establish a different communication path to another of said subscriber stations.

3. A switching system in accordance with claim 2 characterized in that the other subscriber station is terminated in a different one of said switching centers than said one center to which said one subscriber station is connected.

4. A switching system in accordance with claim 2 characterized in that the other subscriber station is connected to the one of the switching centers through which said first communication path was established.

5. A switching system in accordance with claim 2 characterized in that the means for transmitting transfer signals includes means for converting transfer signals transmitted by said one station into alternating-current pulses for transmission as said transfer signals through a plurality of said switching centers.

6. In a telephone system, a main switching center, a satellite switching center having subscriber stations connected thereto, loop means interconnecting said centers, means including a first pulsing circuit for transmitting direct in-dialing signals through said main switching center to said satellite switching center for establishing a connection to one of said subscriber stations, and dial transfer means operative for enabling said one subscriber station to effectuate an automatic transfer of said connection, said dial transfer means including a second pulsing circuit at said satellite center for converting dial pulses to multifrequency signals, a transfer trunk at said main switching center, means for transmitting said multifrequency signals from said second pulsing circuit to said transfer trunk, and means responsive to said transmitted multifrequency signals for again transmitting direct in-dialing signals to said satellite switching center.

7. In a telephone system, a main switching center including a line link frame and a trunk link frame, a step-by-step PBX satellite center having a plurality of subscribers stations connected thereto, loop means interconnecting said centers, means including line link pulsing circuits connected to said line link frame for direct in-dialing to said stations of said PBX center through said main switching center, and dial transfer means for automatically transferring connections among said PBX stations, said transfer means including a dial pulse tone pulsing circuit for converting dial pulses from said PBX stations to multifrequency signals, a transfer trunk connected tc said trunk frame, means including said loop means and said line link pulsing circuits for transmitting said multifrequency signal to said transfer trunk, and means responsive to said transmitted multifrequency signals for operating another of said line link pulsing circuits to transmit direct in-dialing signals to said PBX center.

8. In a telephone system, a main switching center, a PBX switching center having subscriber stations connected thereto, loop means interconnecting said centers, means at said main switching center for transmitting direct-current signals over said loop means to said PBX center to establish a connection to one of said stations, means for transmitting multifrequency signals from said PBX center over said loop means to said main switching center, and means responsive to said multifrequency signals to again transmit direct-current signals from said main switching center to said PBX center to effect a transfer of said connection.

9. In a telephone system, the combination of claim 8 wherein said multifrequency signal transmitting means includes means responsive to direct-current dial pulses received from one of said PBX subscriber stations for converting each of said dial pulses into a specific pair of multifrequency signals.

10. In a telephone system, the combination of claim 9 further comprising means at said main switching center for registering and counting said specific pairs of multifrequency signals.

11. In a telephone system, a main switching center, a satellite switching center having subscriber stations connected thereto, loop means interconnecting said centers, means at said main switching center for transmitting signals over said loop means to said satellite center to establish a connection to one of said stations, and dial transfer means for transfering said connection to another of said stations, said dial transfer means including pulser means at said satellite center for transmitting dial information signals over said loop means back to said main switching center, and means at said main switching center responsive to said dial information signals for causing transmission of additional signals from said main switching center to said satellite switching center to establish a connection to said other station.

12. In a telephone system, the combination of claim 11 wherein said pulser means at said satellite center includes a pair of tone sources, transistor gate means connected to said sources, and means responsive to direct-current dial pulses for controlling said transistor gate means to apply said tones to said loop means.

13. In a telephone switching system, in combination, a first switching center, a second switching center connected to said first switching center, a first and a second subscriber station connected to said second switching center, an incoming trunk connected to said first switching center, a plurality of first pulsing circuits at said first switching center, means responsive to calling signals to establish a communication path from said incoming trunk to said first subscriber station through both said switching centers, said last-mentioned means including one of said first pulsing circuits, a second pulsing circuit at said second switching center, means responsive to transfer signals from said first subscriber station and including said second pulsing circuit for transmitting voice frequency signals back through said second switching center to said first switching center, and means responsive at said first switching center to said voice frequency signals to establish a path from said incoming trunk to said second subscriber station, said last-mentioned means including another of said first pulsing circuits.

14. In a telephone switching system, the combination of claim 13 wherein said second pulsing circuit includes a pair of voice frequency tone sources, transistor gate means connected to said sources, and means responsive to the make and break of dial signals from said first subscriber station for operating said gate means to transmit corresponding voice frequency signals to said first switching center.

15. In a telephone switching system, the combination of claim 14 wherein said gate means includes a first transistor for connecting said tone sources through to said first switching center and a second transistor, said second transistor normally conducting to maintain said first transistor normally nonconducting, said means for operating said gate means comprising means for changing the potential at the base of said second transistor to control its conduction.

References Cited by the Examiner

UNITED STATES PATENTS

| | | | |
|---|---|---|---|
| 2,220,423 | 11/1940 | Nilsson | 179—18.02 |
| 3,041,406 | 6/1962 | Killian | 179—27.02 |
| 3,221,108 | 11/1965 | Seeman et al. | 179—27.02 |

KATHLEEN H. CLAFFY, *Primary Examiner.*

L. A. WRIGHT, *Examiner.*